(12) United States Patent
Young et al.

(10) Patent No.: US 11,316,754 B2
(45) Date of Patent: Apr. 26, 2022

(54) SYSTEMS AND METHODS FOR NETWORK ANALYTICS SERVICE AUTOMATION

(71) Applicant: Verizon Patent and Licensing Inc., Washington, DC (US)

(72) Inventors: Kristen Sydney Young, Morris Plains, NJ (US); Ravi Potluri, Coppell, TX (US); Sudhakar Reddy Patil, Flower Mound, TX (US); Ye Huang, San Ramon, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 16/835,717

(22) Filed: Mar. 31, 2020

(65) Prior Publication Data
US 2021/0144071 A1 May 13, 2021

Related U.S. Application Data

(60) Provisional application No. 62/932,196, filed on Nov. 7, 2019.

(51) Int. Cl.
| | |
|---|---|
| *G06F 15/173* | (2006.01) |
| *G06F 15/16* | (2006.01) |
| *H04L 41/5003* | (2022.01) |
| *H04L 41/0816* | (2022.01) |
| *H04L 41/08* | (2022.01) |
| *H04L 41/14* | (2022.01) |
| *H04L 41/0893* | (2022.01) |

(52) U.S. Cl.
CPC ...... *H04L 41/5003* (2013.01); *H04L 41/0816* (2013.01); *H04L 41/0876* (2013.01); *H04L 41/0893* (2013.01); *H04L 41/14* (2013.01)

(58) Field of Classification Search
USPC .......................................... 709/221, 224, 223
See application file for complete search history.

(56) References Cited

U.S. PATENT DOCUMENTS

| | | | |
|---|---|---|---|
| 9,098,617 B1* | 8/2015 | Pauley, Jr. ............. | G06Q 10/06 |
| 10,078,537 B1* | 9/2018 | Nanda ................ | H04L 41/0273 |
| 10,853,430 B1* | 12/2020 | Gau .................... | G06F 16/9535 |
| 2012/0221955 A1* | 8/2012 | Raleigh ............... | H04L 12/1485 |
| | | | 715/736 |
| 2013/0086249 A1* | 4/2013 | White .................... | H04L 67/16 |
| | | | 709/224 |

(Continued)

FOREIGN PATENT DOCUMENTS

| | | | | |
|---|---|---|---|---|
| WO | WO 2020/025715 A1 * | 7/2018 | ............ | H04W 76/00 |
| WO | WO 2020/066890 A1 * | 9/2018 | ............ | H04L 12/26 |

*Primary Examiner* — Jude Jean Gilles

(57) ABSTRACT

A method may include identifying service requirements associated with a network service, identifying at least one analytics component to monitor the network service and identifying network functions to implement the network service. The method may also include deploying the network functions to monitor the network service, deploying the at least one analytics component and obtaining data associated with monitoring the network service. The method may further include forwarding, by the network functions, the data to the at least one analytics component and determining, by the least one analytics component, whether to take a control action with respect to the network service.

20 Claims, 9 Drawing Sheets

(56) References Cited

U.S. PATENT DOCUMENTS

| | | | |
|---|---|---|---|
| 2014/0173683 A1* | 6/2014 | Zhang | G06F 21/44 |
| | | | 726/1 |
| 2015/0143456 A1* | 5/2015 | Raleigh | H04W 12/088 |
| | | | 726/1 |
| 2016/0094420 A1* | 3/2016 | Clemm | H04L 67/10 |
| | | | 709/224 |
| 2017/0068525 A1* | 3/2017 | Johnston | G06F 8/36 |
| 2017/0249564 A1* | 8/2017 | Garvey | G06N 20/00 |
| 2020/0059420 A1* | 2/2020 | Abraham | H04L 41/5054 |
| 2020/0059856 A1* | 2/2020 | Cui | H04L 41/5012 |

* cited by examiner

SYSTEMS AND METHODS FOR NETWORK ANALYTICS SERVICE AUTOMATION

RELATED APPLICATION

This application claims priority under 35 U.S.C. § 119 based on U.S. Provisional Application 62/932,196 filed Nov. 7, 2019, the contents of which are hereby incorporated herein by reference in their entirety.

BACKGROUND INFORMATION

Analytics is an important factor in ensuring service delivery and network optimization for many types of services in various types of networks. For example, as Fifth Generation (5G) networks are built out to deliver a large number of services, customers typically order services from a service provider. The service provider then allocates or deploys resources to satisfy the customers' orders. The service provider must also monitor the services for compliance with various service requirements. Such monitoring is often a labor intensive and costly process.

For example, deployment of analytics related components to monitor network services typically rely on a third party vendor to design a customized analytics system/platform for each particular service. Integrating customized analytics systems locks in the service provider to using the particular third party vendor's solution. In addition, the customized analytics systems often provide little flexibility with respect to monitoring new services, resulting in the generation and deployment of additional customized analytics systems.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to automating the generation and deployment of analytics services/systems in a network. In an exemplary implementation, an analytics platform defines descriptors and/or a format for descriptors that may be used with the analytics platform for an analytics service and its components, such as an analytics engine, an analytics controller, and defines logical links between the analytics components. The analytics platform may also provide for automatic deployment of analytics components at the proper place in a network to obtain the required monitoring data in an efficient manner. In some implementations, the analytics controller may take actions based on the analyzed data, such as set a network policy, update a network policy, change configurations of network components, etc.

Implementations described herein also provide a framework to automatically construct and deploy analytics services based on service requirements using a library or catalog of analytics engines, controllers and descriptors associated with various types of analytics services. The automatic deployment of analytics services and analytics service-related components as described herein helps ensure that network service delivery meets service requirements and aids in optimizing network performance in an environment where services for customers may be dynamically created and enabled.

Figure 1:
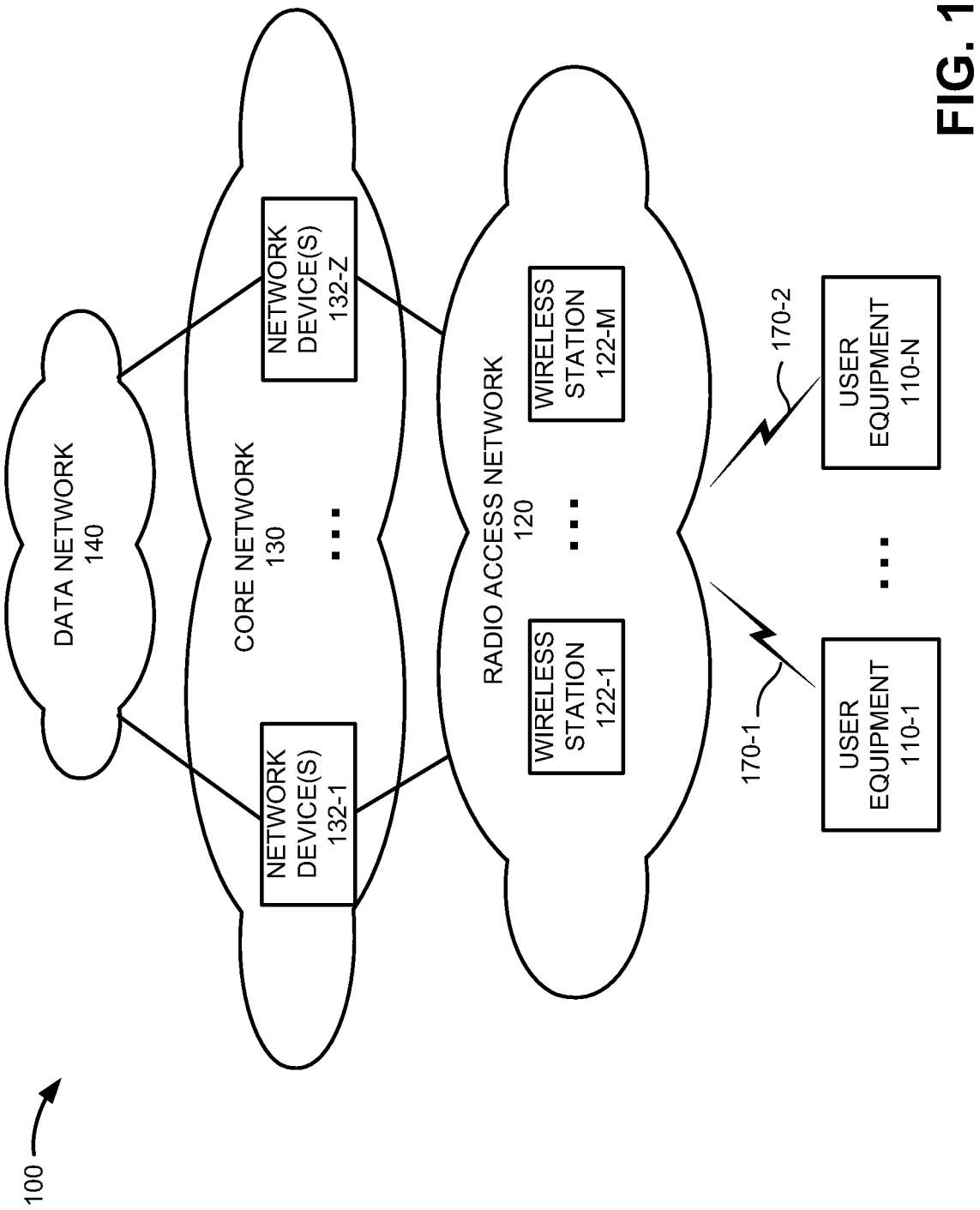
FIG. 1 illustrates an exemplary environment in which systems and methods described herein may be implemented.

FIG. 1 is a diagram of an exemplary environment 100 in which the systems and methods described herein may be implemented. Referring to FIG. 1, environment 100 includes user equipment (UE) devices 110-1 to 110-N (referred to herein collectively as UE devices 110 and individually as UE device 110 or 110-X), a radio access network (RAN) 120, a core network 130, and a data network 140. RAN 120, core network 130, and data network 140 may be collectively referred to as a transport network.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; an Internet of Things (IoT) device, such as a home appliance device, a home monitoring device, etc.; and/or any other type of computer device with wireless communication capabilities. UE device 110 may include capabilities for voice communication, mobile broadband services (e.g., video streaming, real-time gaming, premium Internet access etc.), best effort data traffic, and/or other types of applications. In some implementations, UE device 110 may communicate using machine-to-machine (M2M) communication, such as machine-type communication (MTC), and/or another type of M2M communication.

RAN 120 may enable UE devices 110 to connect to core network 130 for mobile telephone service, Short Message Service (SMS) message service, Multimedia Message Service (MMS) message service, Internet access, cloud computing, and/or other types of data services. RAN 120 may include wireless stations 122-1 to 122-M (referred to herein collectively as "wireless stations 122" and individually as "wireless station 122"). Each wireless station 122 may service a set of UE devices 110. For example, wireless station 122-1 may service some UE devices 110 when the UE devices 110 are located within the geographic area serviced by wireless station 122-1, while other UE devices 110 may be serviced by another wireless station 122 when the UE devices 110 are located within the geographic area serviced by the other wireless station.

Wireless station 122 may include a 5G base station (e.g., a next generation NodeB (gNB)) that includes one or more radio frequency (RF) transceivers. For example, wireless station 122 may include three RF transceivers and each RF transceiver may service a 120 degree sector of a 360 degree field of view. Each RF transceiver may include an antenna array. The antenna array may include an array of controllable antenna elements configured to send and receive 5G new radio (NR) wireless signals via one or more antenna beams. The antenna elements may be digitally controllable to electronically tilt or adjust the orientation of an antenna beam in a vertical direction and/or horizontal direction. In some implementations, the antenna elements may additionally be controllable via mechanical steering using one or more motors associated with each antenna element. The antenna array may serve a larger number of UE devices 110, and may simultaneously generate a large number of antenna beams. A particular antenna beam may service multiple UE devices 110. In some implementations, wireless station 122 may also include a 4G base station (e.g., an evolved NodeB (eNodeB)). Furthermore, in some implementations, wireless station 122 may include a mobile edge computing (MEC) system that performs cloud computing and/or network processing services for UE devices 110.

Core network 130 may manage communication sessions for UE devices 110 and may include network devices 132-1 to 132-Z (referred to herein collectively as "network devices 132" and individually as "network device 132"). For example, core network 130 may establish an Internet Protocol (IP) connection between UE device 110 and a particular data network 140. In addition, core network 130 may enable UE device 110 to communicate with an application server, and/or another type of device, located in data network 140 using a communication method that does not require the establishment of an IP connection between UE device 110 and data network 140, such as, for example, Data over Non-Access Stratum (DoNAS). Core network 130 may include various types of network devices 132, which may implement different network functions described herein.

In some implementations, core network 130 may include a 5G core network or other advanced network that includes functionality such as management of 5G new radio (NR) base stations; carrier aggregation; advanced or massive multiple-input and multiple-output (MIMO) configurations; cooperative MIMO (CO-MIMO); relay stations; Heterogeneous Networks (HetNets) of overlapping small cells and macrocells; Self-Organizing Network (SON) functionality; MTC functionality, such as 1.4 megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality. Furthermore, core network 130 may include a Long Term Evolution (LTE) access network (e.g., an evolved packet core (EPC) network). In other implementations, core network 130 may include a Code Division Multiple Access (CDMA) network. For example, the CDMA network may include a CDMA enhanced High Rate Packet Data (eHRPD) network (which may provide access to an LTE access network).

As described further herein, core network 130 may include components and/or functions to perform analytics with respect to network services. For example, core network 130 may include a service orchestrator that automatically deploys analytics components in environment 100, as described in detail below.

Data network 140 may include a packet data network. Data network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, the Internet or a combination of networks. Some or all of a particular data network 140 may be managed by a communication services provider that also manages core network 130, radio access network 120, and/or UE devices 110. For example, in some implementations, data network 140 may include an IP Multimedia Subsystem (IMS) network (not shown in FIG. 1). An IMS network may include a network for delivering IP multimedia services and may provide media flows between two different UE devices 110, and/or between a UE device 110 and external IP networks or external circuit-switched networks (not shown in FIG. 1).

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

As described above, services implemented in environment 100 are typically monitored and analyzed. For example, most network services have an associated service level agreement (SLA) and the service provider monitors the services to ensure that the services meet the particular SLA requirements. As also described above, providing analytics services typically requires a customized solution provided by a third party (i.e., a party other than the service provider that provides the actual service). In accordance with an exemplary implementation, analytics services may be automatically generated and deployed by a service provider based on service requirements to provide the desired network analytics.

Figure 2:
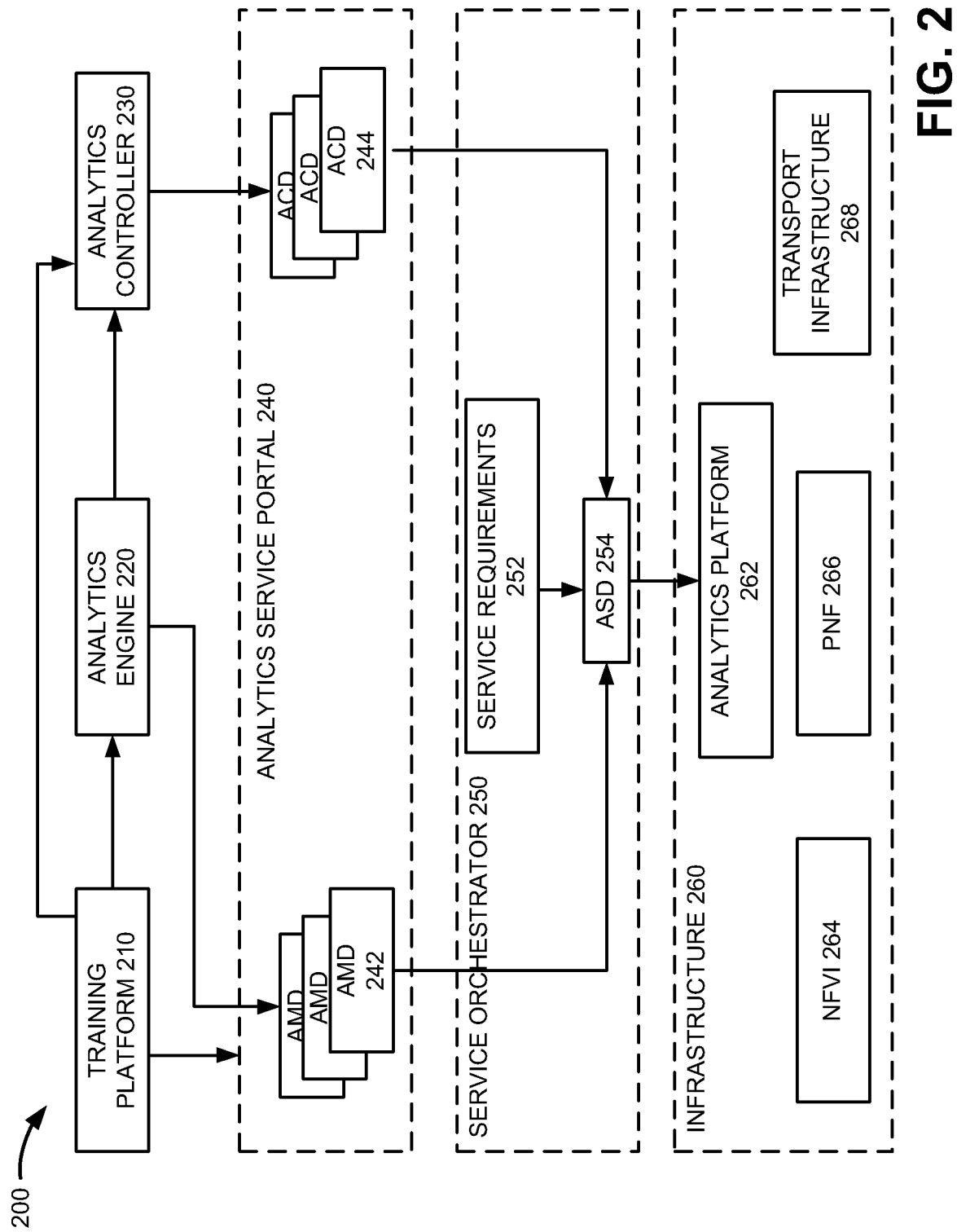
FIG. 2 illustrates an exemplary system associated with automating the generation and deployment of network analytics components in a network environment.

FIG. 2 illustrates an exemplary system 200 associated with automating the generation and deployment of network analytics in a network environment, such as environment 100. Referring to FIG. 2, system 200 includes a training platform 210, analytics engine 220, analytics controller 230, analytics service portal 240, service orchestrator (SO) 250 and infrastructure 260. Although only a single training platform 210, analytics engine 220, analytics controller 230, analytics service portal 240, SO 250 and infrastructure 260 are shown in FIG. 2, in other implementations, system 200 may include multiple training platforms 210, analytics engines 220, analytics controllers 230, analytics service portals 240, SOs 250 and infrastructures 260, such as a catalog or library of analytics engines 220 and controllers 230, as well as a catalog/library of descriptors associated with analytics engines 220 and controllers 230. In still other implementations, system 200 may include fewer components, different components, differently arranged components, or additional components than depicted in FIG. 2. Additionally or alternatively, one or more components of system 200 may perform functions described as being performed by one or more other components of system 200.

Training platform 210 may include one or more processors and/or computing devices that store training data and apply artificial intelligence and machine learning (ML) algorithms to develop and train models used by, for example, analytics engine 220 and analytics controller 230 to perform analytics for a particular network service. For example, training platform 210 may store information regarding particular network services and the service requirements (e.g., SLAs) for the particular network services. Training platform 210 may also obtain data from network functions associated with deployed services and continuously update the training models and the algorithms. Training platform 210 may provide such updates as inputs to analytics engine 220, analytics controller 230 and elements in analytics service portal 240, such as analytics module descriptors (AMDs) 242 and analytics controller descriptors (ACDs) 244 to ensure that the analytics components are able to effectively perform their analytics functions, as described in detail below.

Analytics engine 220 may include one or more processors and/or computing devices that use ML algorithms and/or an inference engine to generate analytics associated with network services based on continuous monitoring of such services. For example, analytics engine 220 may receive data associated with a particular network service and determine whether the service is meeting SLA requirements. Analytics engine 220 may provide this information to other devices in system 210, such as analytics controller 230, training platform 210 and/or AMD 242. AMD 242 may use the feedback from analytics engine 220 to adjust ML algorithms associated with the particular analytics engine 220. In this manner, continuous training based on new data and analytics may result in an update of analytics engine 220 and/or AMD 242, as well as result in modifications to a deployed analytic service (AS) (e.g., modifications to deployed analytic components within infrastructure 260).

Analytics controller 230 may include one or more processors and/or computing devices that receive data and analytics and performs one or more actions based on the analytics. For example, analytics controller 230 may set a network policy based on the analytics, update a network policy based on the analytics, change configurations of one or more network devices, etc. As one example, analytics controller 230 may determine that an additional component and/or network function is needed in a network slice used to provide a particular network service for a customer. A network slice may correspond to a logical network that includes an end-to-end virtual network with dedicated storage and/or computational resources. In this manner, analytics controller 230 may aid in optimizing the number of components and placement of components deployed to provide the desired services in environment 100. Analytics controller 230 may also act as a closed-loop controller, as described in detail below.

Analytics service portal 240 may include a library of descriptors that describe inputs (e.g., data and analytics) and outputs (e.g., analytics) as well as optimization objectives of an analytics controller. For example, analytics service portal 240 may include a library of AMDs 242 and ACDs 244. In an exemplary implementation, analytics service portal 240 may correspond to a web portal accessible to one or more service providers and other entities for selecting descriptors used by, for example, SO 250 to select and deploy networks analytics functions in environment 100. In one implementation, each AMD 242 describes inputs, such as data and analytics and outputs, such as analytics associated with a particular service. AMDs 242 allow SO 250 to select particular analytics engines 220 for deployment in infrastructure 260 based on particular requirements associated with a network service.

Each ACD 244 may also describe inputs, such as data and analytics, as well as optimization objectives of analytics controller 230. In one implementation, each ACD 242 describes inputs, such as data and analytics and provides outputs, such as control information associated with a particular service. ACDs 244 allow SO 250 to select particular analytics controllers 230 for deployment in infrastructure 260 based on particular service requirements associated with a network service.

Service orchestrator (SO) 250 may include one or more processors and/or computing devices used to support the automatic generation and deployment of analytics components in system 200. In one implementation, SO 250 includes service requirements 252 and ASDs 254. For example, in one implementation, service requirements 252 may include one or more memory devices that store information, such as SLA information, for particular services provided in environment 100. This information may be used by SO 250 to identify the appropriate analytics engines 220 and/or controllers 230 to deploy in environment 100 to monitor network services.

Each ASD 254 describes one or more analytic services that may include analytics engines 220 and/or analytics controllers 230 that are to be deployed in environment 100, as well as the location of the analytics components to be deployed in environment 100 (e.g., logical locations) and the connections between the analytics components. In one implementation, SO 250 determines the optimization objectives of a network service based on service requirements 252 (e.g., SLAs) and constructs an analytics service described by an ASD 254, for deployment in infrastructure 260. For example, each ASD 254 identifies what analytic engines 220 and analytics controllers 230 are needed for a particular service, the location at which the analytics engines 220 and controllers 230 are to be deployed, the data sources for the analytics components, the logical connections between the analytics engines 220, analytics controllers 230 and data sources, etc.

Infrastructure 260 may include elements of environment 100, such as elements of core network 130, RAN 120 and/or data network 140 used to implement network services. In one implementation, infrastructure 260 may include analytics platform 262, network function virtualization infrastructure (NFVI) 264, physical network functions (PNFs) 266 and transport infrastructure 268 associated with a 5G network.

Analytics platform 262 may support lifecycle management of multiple analytics services within infrastructure 260. For example, analytics platform 262 may support NFVIs 264, PNFs 266 and transport infrastructure 268. NFVIs 264 may include virtual network functions (VNFs) used to provide network services in a virtualized environment. For example, NFVI 264 may include a number of VNFs that implement a network slice to provide a particular network service for a customer. PNFs 266 may include physical network devices/components, such as routers, switches, load balancers, etc. Transport infrastructure 268 may include virtual and/or physical components and connections to provide network services and enable the analytics components to receive analytics-related information, as described in more detail below.

Figure 3:
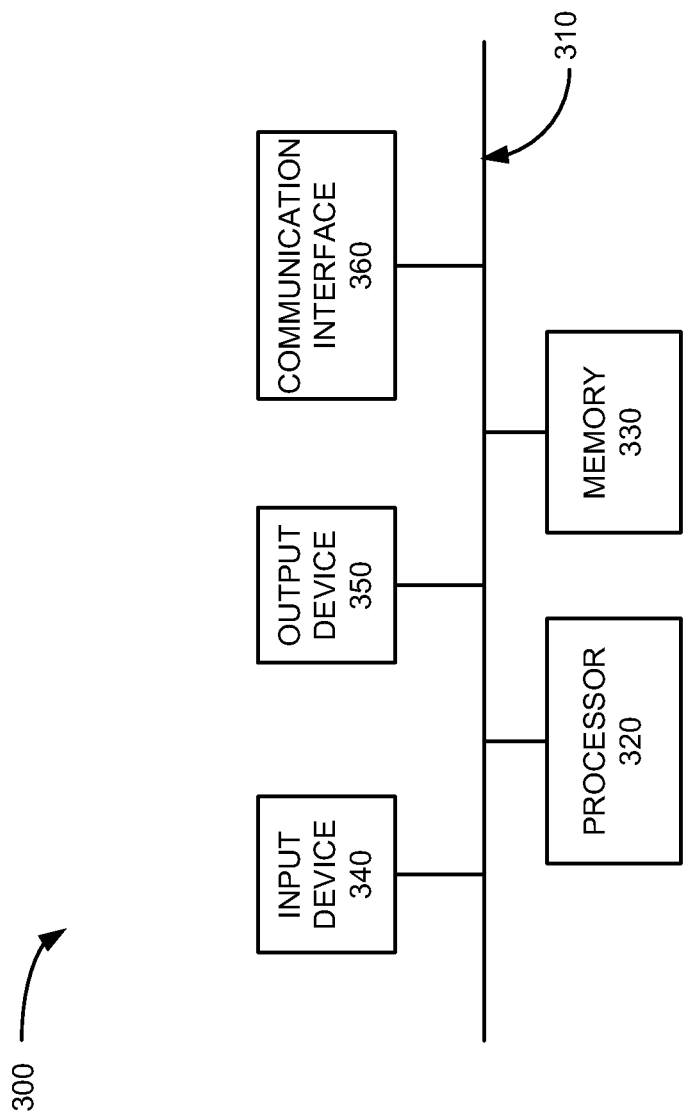
FIG. 3 illustrates an exemplary configuration of a device implemented in one or more of the components of FIGS. 1 and 2.

FIG. 3 illustrates an exemplary configuration of a device 300. Device 300 may correspond to or include elements implemented in and/or used to implement elements of environment 100 and system 200 (e.g., UE 110, wireless stations 122, network devices 132, devices in network 140, training platform 210, analytics engine 220 and analytics controller 230, service orchestrator 250, etc.). Referring to FIG. 3, device 300 may include bus 310, processor 320, memory 330, input device 340, output device 350 and communication interface 360. Bus 310 may include a path that permits communication among the elements of device 300.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD)), a printer, a speaker, etc. In some implementations, a touch screen display may act as both an input device and an output device.

Communication interface 360 may include one or more transceivers that device 300 uses to communicate with other devices via wired, wireless or optical mechanisms. For example, communication interface 360 may include one or more radio frequency (RF) transmitters, receivers and/or transceivers and one or more antennas for transmitting and receiving RF data via core network 140. Communication interface 360 may also include a modem or an Ethernet interface to a LAN or other mechanisms for communicating with elements in a network, such as RAN 120, core network 130 and data network 140 or another network.

The exemplary configuration illustrated in FIG. 3 is provided for simplicity. It should be understood that device 300 may include more or fewer devices than illustrated in FIG. 3. In an exemplary implementation, device 300 performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

As described above, a library or catalog of AMDs 242 may be used to select an analytics engine 220 for a particular service. For example, each AMD 242 may use a machine readable/executable language to describe one or more operating modes associated with a corresponding analytics engine 220. Each operating mode may support a specific customization supported by the engine 220, such as different timescales at which the corresponding analytics engine 220 should operate. For example, based on the particular network service, an analytics engine 220 associated with the service may run on a 200 milliseconds (ms) timescale (i.e., analytics engine 220 repeats the process every 200 ms), a five second timescale, a 10 minute timescale, etc. For example, for services in which real-time or near real-time monitoring is needed, a short timescale (e.g., 200 ms or less) may be used.

Figure 4:
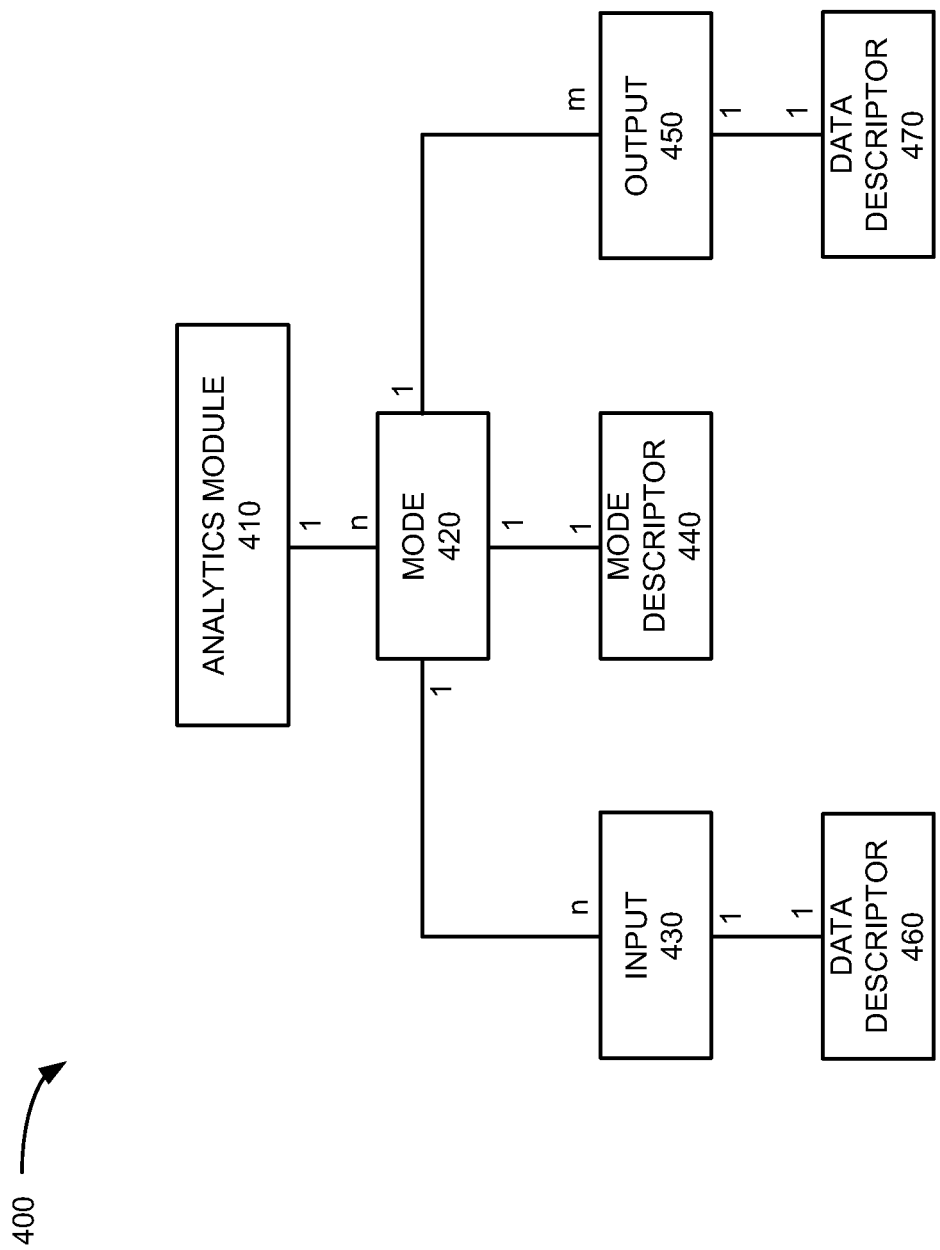
FIG. 4 illustrates a data model for an analytics module descriptor in accordance with an exemplary implementation.

FIG. 4 illustrates an exemplary data model 400 for an AMD 242. Referring to FIG. 4, data model 400 includes an analytics module 410 (corresponding to an analytics engine 220), mode 420, input 430, mode descriptor 440, output 450 and data descriptors 460 and 470. Mode descriptor 440 for each mode identifies customization attributes for analytics module 410, such as the intended timescale (e.g., 100 ms, two seconds, five minutes, etc.). Input 430 provides inputs to mode 420. The number of inputs may range from 1 to n and the inputs may include raw data, correlated data, inferred data and/or analytics. Output 450 receives outputs from mode 420. The number of outputs may range from 1 to m (e.g., a positive integer). In some implementations, m is equal to 1. That is, in some implementations, for each set of inputs, mode 420 provides a single output, which may correspond to analytics, insights/inferences based on the data and mode, etc. In an exemplary implementation, each of input 430 and output 450 may be described by a data descriptor using a Data Description Language (DDL) that includes an item identifier (ID) (e.g., a data topic, analytics topic, etc.), access types (e.g., open database connectivity (odbc), kafka, representational state transfer (REST), domain (e.g., service, RAN, core, transport, etc.), frequency of input/output (e.g., 5 ms, 2 seconds, etc.), access mode for input/output (e.g., push, pull).

Data descriptors 460 and 470 allow for proper deployment of analytics controllers 230 based on the type of data, such as the domain and frequency. For example, an analytics engine 220 may need to be deployed at the edge of a network in a RAN domain (e.g., RAN 120). As described in more detail below, an AMD 242 may be used to identify an analytics engine 220 to be deployed in environment 100. In each case, the data model 400 for AMD 242 may be used to identify a particular analytics engine 220 for monitoring a network service.

As also described above, a library or catalog of ACDs 244 may be used to identify analytics controllers 230 for a particular service. Similar to AMDs 242, each ACD 244 may use a machine readable/executable language to describe the controller (e.g., analytics controller 230), and one or more operating modes where each mode corresponds to a specific customization supported by an analytics controller 230, such as different timescales at which the module can operate. One or more inputs are described for each mode using a Data Descriptor that describes both data and analytics, both of which can be inputs and outputs for each mode, described by a Control Descriptor.

Figure 5:
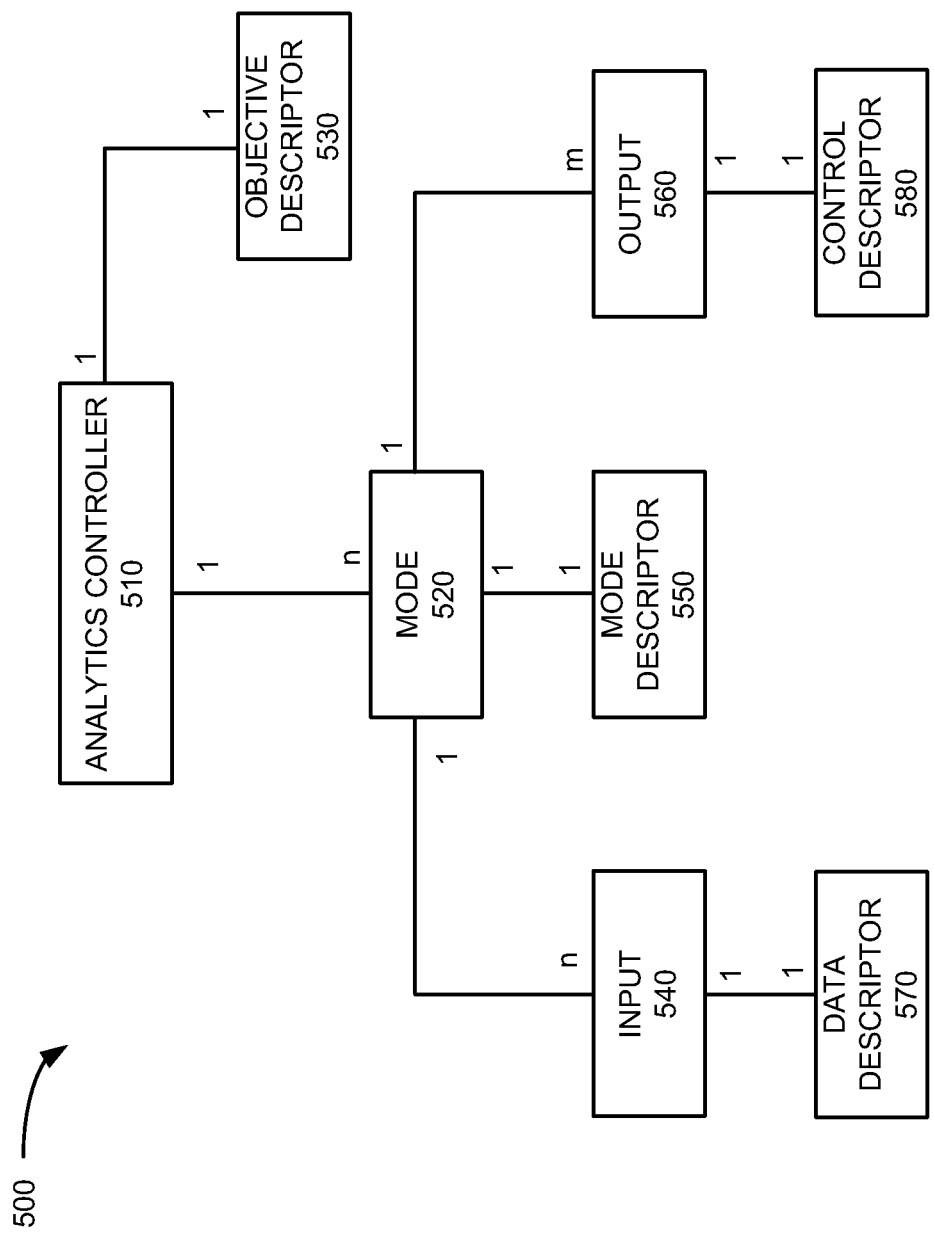
FIG. 5 illustrates a data model for an analytics controller descriptor in accordance with an exemplary implementation.

FIG. 5 illustrates an exemplary data model 500 for an ACD 244. Referring to FIG. 5, data model 500 includes an analytics controller 510 (corresponding to analytics controller 230), mode 520, objective descriptor 530, input 540, mode descriptor 550, output 560, data descriptor 570 and control descriptor 580. Analytics controller 510 is described by an objective descriptor 530 and operating modes, where each mode corresponds to a specific customization supported by analytics controller 510. In an exemplary implementation, objective descriptor 530 identifies an optimization objective, such as what the analytics controller 510 should optimize. For example, objective descriptor 530 may identify latency requirements for a service, retainability with respect to the duration of the service, power savings associated with network functions, Quality of Experience (QoE) provided by the service, etc., and a control domain, such as service, RAN (e.g., RAN 120), core (e.g., core 130), etc.

Similar to mode descriptor 440, mode descriptor 550 identifies customization attributes, such as an intended timescale for the analytics controller 510. Input 540 provides inputs to mode 520. The number of inputs may range from 1 to n, where each of the inputs may include raw data, correlated data, inferred data and/or analytics from another analytics controller 510, and each of the inputs is described via, for example, a control descriptor. Output 560 receives output from mode 520. The number of outputs may range from 1 to m. Outputs 560 may identify entities through which the control is asserted (e.g., a network function (NF), such as a Session Management Function (SMF), a Mobility Management Entity (MME), an Access and Mobility Management Function (AMF), a Home Subscriber Server (HSS), a Unified Data Management (UDM), a Policy and Charging Function (PCF), a network function virtualization orchestrator (NFVO), a RAN intelligent controller (MC), a Centralized Unit Control Plan (CU-CP) and/or other devices/functions implemented in core network 130. Output 560 may also identify how the control is asserted (e.g., policy, configuration management (CM), etc.) and the effects of control (e.g., Quality of Service (QoS) policy, multi-radio access technology (RAT) selection, etc.). Data Descriptor 570 and Control Descriptors 580 may include information regarding data provided to input 540 and output 560, respectively, such as the expected type of information provided as inputs/outputs, respectively.

Referring back to FIG. 2, SO 250 may stich together or construct an analytics service (AS) based on service requirements (e.g., SLAs to maintain) and AMDs 242 and ACDs 242 to provide and deploy analytics components in an automated manner. For example, SO 250 automatically generates ASDs 254, where each ASD 254 describes one analytics service to be deployed to monitor a network service, such as a network service implemented in core network 130 and/or RAN 120 in environment 100. That is, SO 250 does not require input from an operator associated with the service provider to manually identify analytics components to monitor the service. Each ASD 254 describes what analytics engines 220 may be needed and the location of each analytics engine 220 that is to be deployed in a network based on required timescale, domain, optimization parameters, etc. For example, using standardized descriptors (e.g., AMDs 242, ACDs 244) for analytics services and its constituent components, such as analytics engines 220 and analytics controllers 120, SO 250 may select and deploy analytics services in an automated fashion. For example, an ASD 254 may include analytics engines 220, each being supplied with data from data sources, and analytics controllers 230 to take actions based on the analytics, as described below. In one implementation, SO 250 uses the descriptors to determine what mode in which to run the analytics components and then identify particular analytics engines 220 and/or controllers 230 that correspond to the descriptors (e.g., AMD 242 and ACD 244).

Figure 6:
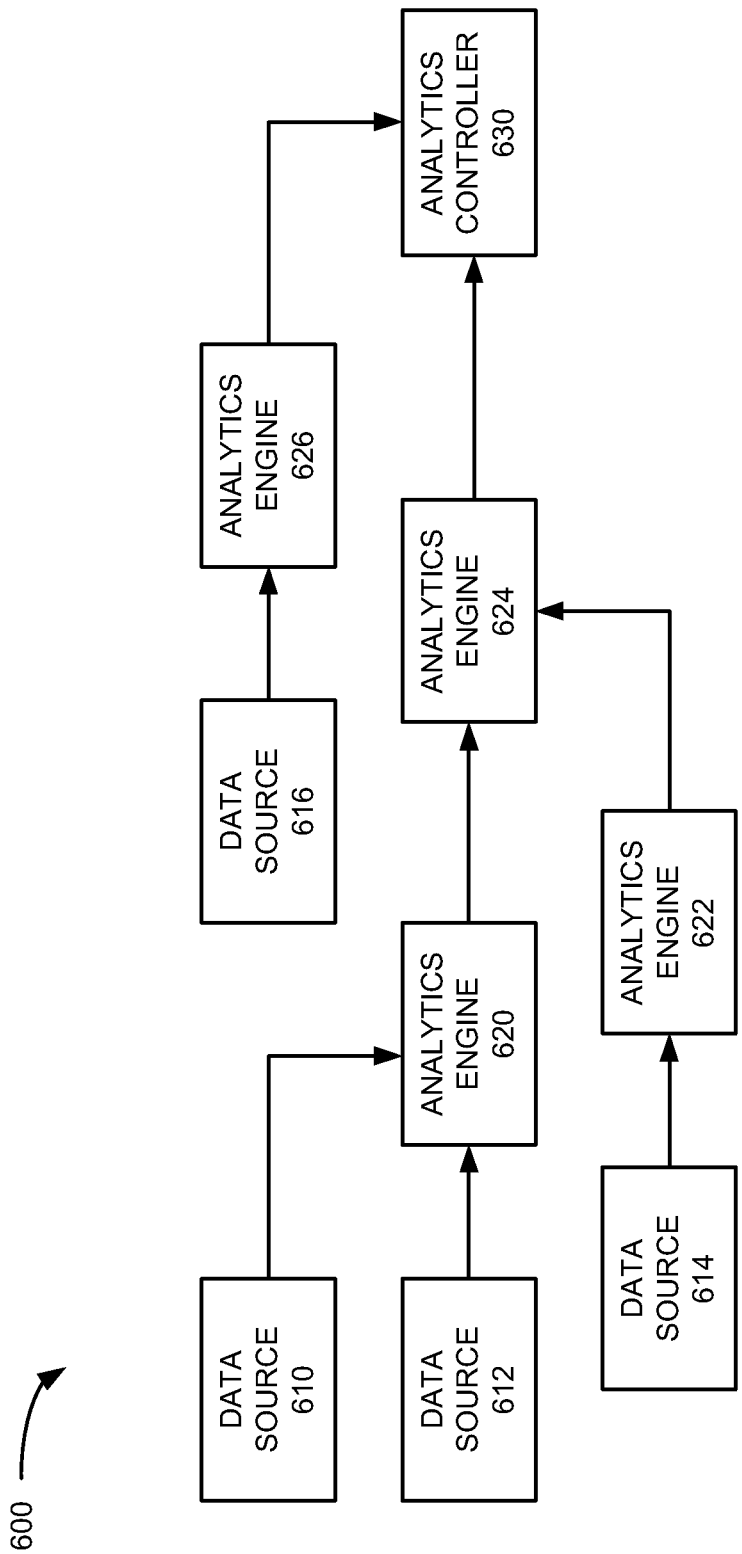
FIG. 6 illustrates an analytics service deployed in a network environment in accordance with an exemplary implementation.

FIG. 6 illustrates an exemplary analytics service 600 based on an analytics service descriptor (ASD) 254. As described above, each ASD 254 describes analytics components (e.g., analytics engines 220 and controllers 230, data sources and the logical connections between the components. Referring to FIG. 6, analytics service 600, which may be deployed in environment 100, includes data sources 610, 612, 614 and 616, analytics engines 620, 622, 624 and 626 and analytics controller 630 with particular connections between the components as illustrated. Data sources 610, 612, 614 and 616 may represent virtual network functions (VNFs) and/or physical network functions (PNFs). The VNFs and PNFs may perform network services and/or obtain data associated with a network service and provide the data to, for example, analytics engines 620, 622, 624 and 626. Analytics engines 620, 622, 624 and 628 may receive and consume data from data sources 610-616 as well as from other analytics engines. For example, analytics engine 624 may receive analytics from analytics engines 620 and 622.

Each ASD 254 may also define how many analytics controllers 230 are needed. For example, one analytics controller 230 is needed in the analytics service 600 of FIG. 6. The appropriate logical locations in the network at which the analytics controller(s) 230 are to be deployed (not shown in FIG. 6) are also defined in ASD 254. Such locations may be determined based on, for example, the required timescale, domain, controlled entities, optimization parameters, etc., which, in turn, may be determined based on the service requirements for the particular service. For example, analytics engines 620 and 622 may be deployed on the edge of a network, such as at the interface of RAN 120 and core network 130, while engines 624 and 626 may be deployed within core network 130.

Each ASD 254 may further define how analytics engines 620-626, data sources 610-616 and analytics controller 630 are logically connected. For example, in system 600, a single analytics controller 630 receives input from analytics engines 624 and 626. Analytics controller 630 may then perform control actions, if necessary, based on the input from analytics engines 624 and 626, as described in more detail below.

Figure 7:
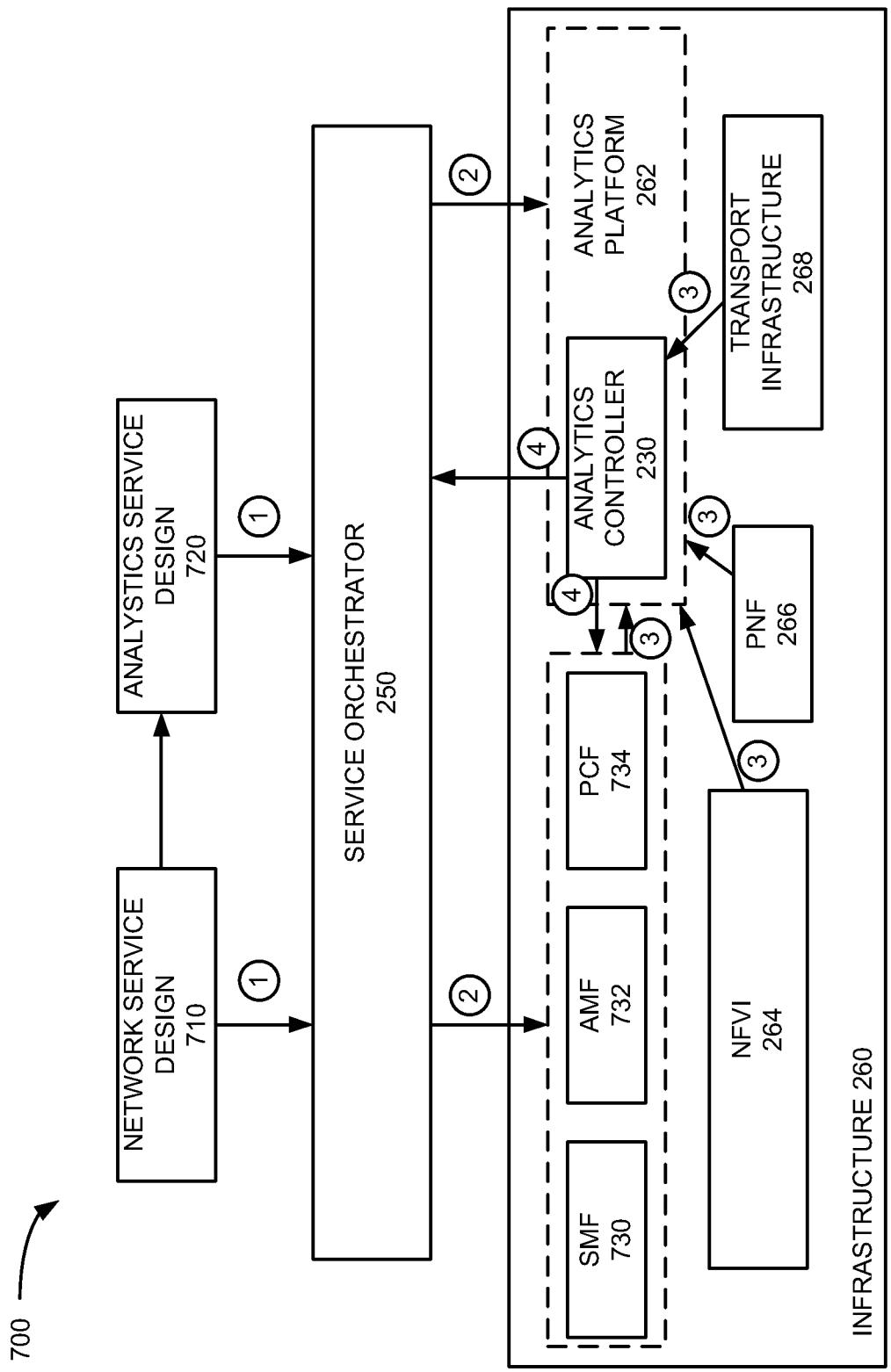
FIG. 7 illustrates a system associated with automating the deployment of analytics components and providing closed-loop control in accordance with an exemplary implementation.

FIG. 7 is a diagram illustrating an exemplary system 700 for generating and deploying analytic services in environment 100. The numbers 1-4 shown in circles are described with respect to the process described in FIG. 8. In this implementation, system 700 may include an analytics controller 230 that generates network function (NF)-specific actions based on data received from NFs and insights gained from the received data. In some implementations, analytics controllers 230 may be deployed with or be part of the NFs. In each case, insights generated by analytic controller 230 based on the received data may be used by NFs or by service orchestrator 250, to update the behavior and/or operation of NFs and/or network service.

Referring to FIG. 7, system 700 includes network service design 710, analytics service design 720, SO 250 and infrastructure 260. Network service design 710 may include one or more processors or computing devices used to describe a particular network service. For example, a customer may order a network service for use at certain times of day, such as an access service (e.g., Internet service, connectivity service, a private network, etc.) for use between two separate offices between 2:00 PM and 5:00 PM each day. Network service design 710 may identify a particular network slice in core network 130 that will be used to implement the network service during the desired time period.

Analytics service design 720 may include one or more processors or computing devices that describe or identify what type(s) of analytics are required for the particular service provided to the customer. For example, analytics service design 720 may generate and/or identify descriptors (e.g., AMDs 242, ACDs 244, etc.) that will be used to select analytics engines 220 and/or analytics controllers 230 and generate an analytics service (e.g., ASD 254). The ASD 254 may then be used to automatically deploy network analytics components to monitor the service during the desired time period to ensure that the service meets SLA requirements. For example, analytics service design 720 may identify or more analytics controllers 230, inputs to the analytics controller(s) 230 and the location of the analytics controller(s) 230 to ensure that the service is operating properly and provide closed-loop control for the service in accordance with the SLA requirements associated with the service.

SO 250 may receive information from network service design 710 and analytics service design 720 and identify network functions and analytics functions to deploy in infrastructure 260. As illustrated, the network functions deployed within infrastructure 260 may include 5G network functions, such as session management function (SMF) 730, access and mobility management function (AMF) 732, policy and charging function (PCF) 734, network function virtualization infrastructure (NFVI) 264, physical network functions (PNFs) 266, transport infrastructure 268, etc. In a fourth generation (4G)/LTE network, other components and/or functions may be deployed. In each case, SO 250 deploys analytics related components, such as analytics controllers 230, analytics engines 220, data models (e.g., models 400, 500, etc.) to analytics platform 262.

Once the NFs associated with providing the network service and the analytics components (e.g., network data analytics functions (NWDAFs)) associated with monitoring the network service have been deployed within infrastructure 260, and the network service is operational, the NFs and infrastructure elements provide data to analytics platform 262. Analytics platform 262 receives the data and generates actions and/or insights. For example, analytics controller 230 may identify actions to take based on the received data. As an example, analytics controller 230 may set a network policy associated with operations by the NFs, update a network policy, change a configuration of one or more NFs and forward these insights and actions to the appropriate NFs and/or SO 250. In this manner, analytics controller 230 may automatically provide insight and/or perform actions with respect to network services, and system 700 effectively provides a closed-loop control system with respect to network services.

Figure 8:
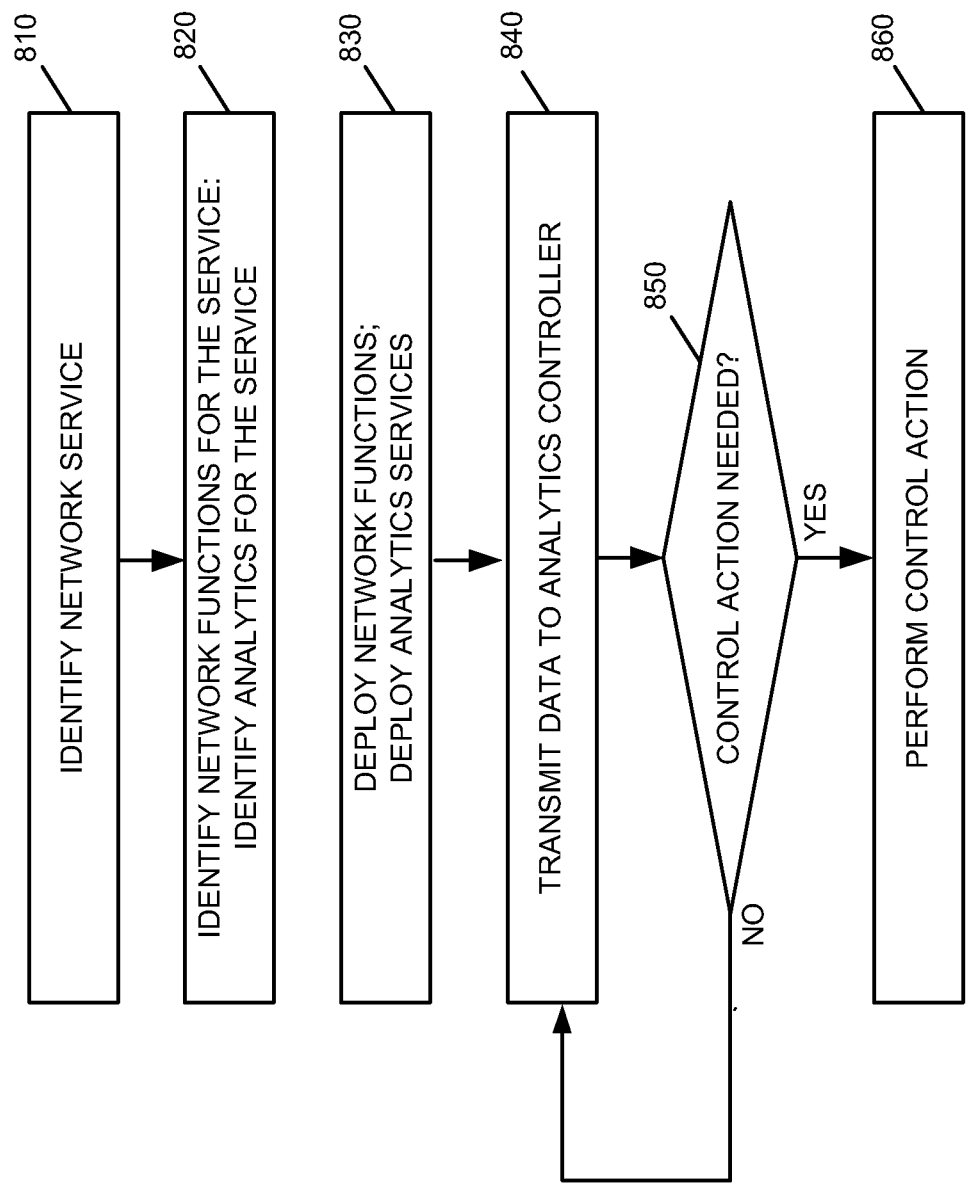
FIG. 8 is a flow diagram associated with automating the deployment of analytics components and providing closed-loop control in accordance with an exemplary implementation.

FIG. 8 is an exemplary flow diagram associated with deploying analytics and providing closed-loop control in a network environment and will be described in conjunction with elements of system 700 (FIG. 7). Processing may begin with network service design 710 and analytics service design 720 identifying a network service to be deployed in environment 100 (block 810). Continuing with the example above, a customer may order network services to be provided between 2:00 PM and 5:00 PM each day. In this example, network service design 710 may automatically identify network functions of a network slice to fulfill the customer's order (block 820).

Analytics service design 720 may also identify types of analytics to be performed for the service based on descriptors (e.g., AMDs 242 and ACDs 244). For example, analytics service design 720 may identify relevant descriptors based on the service requirements that will be used to select analytics engines 220 and analytics controllers 230 to monitor the network service and ensure that the customer receives the requested service (block 820).

After the network service design 710 and analytics service design 720 have identified the network functions and service descriptors, network service design 710 and analytics service design 720 may forward the service-related information and analytics related information to SO 250, as illustrated by the circles numbered "1" in FIG. 7.

SO 250 receives the service-related information and the analytics-related information. SO 250 may then identify NFs to deploy in infrastructure 260 to perform the network service. SO 250 may also generate an analytics service description (e.g., ASD 254) that identifies analytics components, such as an one or more analytics engines 220 and/or analytics controllers 230 that will be used to monitor the service. SO 250 may then automatically deploy the network functions and analytics services components (block 830), as illustrated by the circles numbered "2" in FIG. 7. In system 700, only a single analytics controller 230 is shown for simplicity. It should be understood that SO 250 may deploy multiple analytics engines 220 and analytics controllers 230 based on the particular service and without requiring an operator to manually deploy the analytics components.

After the network service and analytics components have been deployed and enabled, infrastructure elements 260 may then transmit data to analytics controller 230 (block 840), as indicated by circles numbered "3" in FIG. 7. For example, SMF 730, AMF 732, PCF 734, NFVI 264, PNF 266 and transport infrastructure 268 may transmit data, such as timing/latency data associated with the provided service, data throughput associated with the provided service, etc.

Analytics controller 230 may then analyze the data and determine if any action is needed (block 850). For example, analytics controller 230 may determine that the latency associated with the network service is not within thresholds provided by an SLA for that service. In this case, analytics controller 230 sends one or more control actions to SO 250 (block 860), as indicated by the circle numbered "4" in FIG. 7. Analytics controller 230 may also provide control actions directly to the NFs, such as SMF 730, AMF 732 and PCF 734 that are associated with the particular service, as also indicated by a circle numbered "4" in FIG. 7. If analytics controller 230 determines that no action is needed (block 850—no), analytics controller 230 may continue to receive data at block 840 and monitor the received data/analytics. In this manner, analytics controller 230 may provide closed-loop control in system 700 to ensure that the service is provided in accordance with the service requirements (e.g., SLA).

As described above, system 700 may be used to identify the appropriate network services and automatically deploy analytic components to monitor the services within environment 100. In accordance with an exemplary implementation, SO 250 may deploy multiple NWDAFs within a network (e.g., environment 100) to provide the desired analytics and closed loop control. In such an implementation, network data analytics function (NWDAF) may correspond to analytics engines 220 described above. In accordance with the 3rd Generation Partnership Project (3GPP), an NWDAF is defined to produce a set of standard defined analytics identified by analytics identifiers (IDs).

Figure 9:
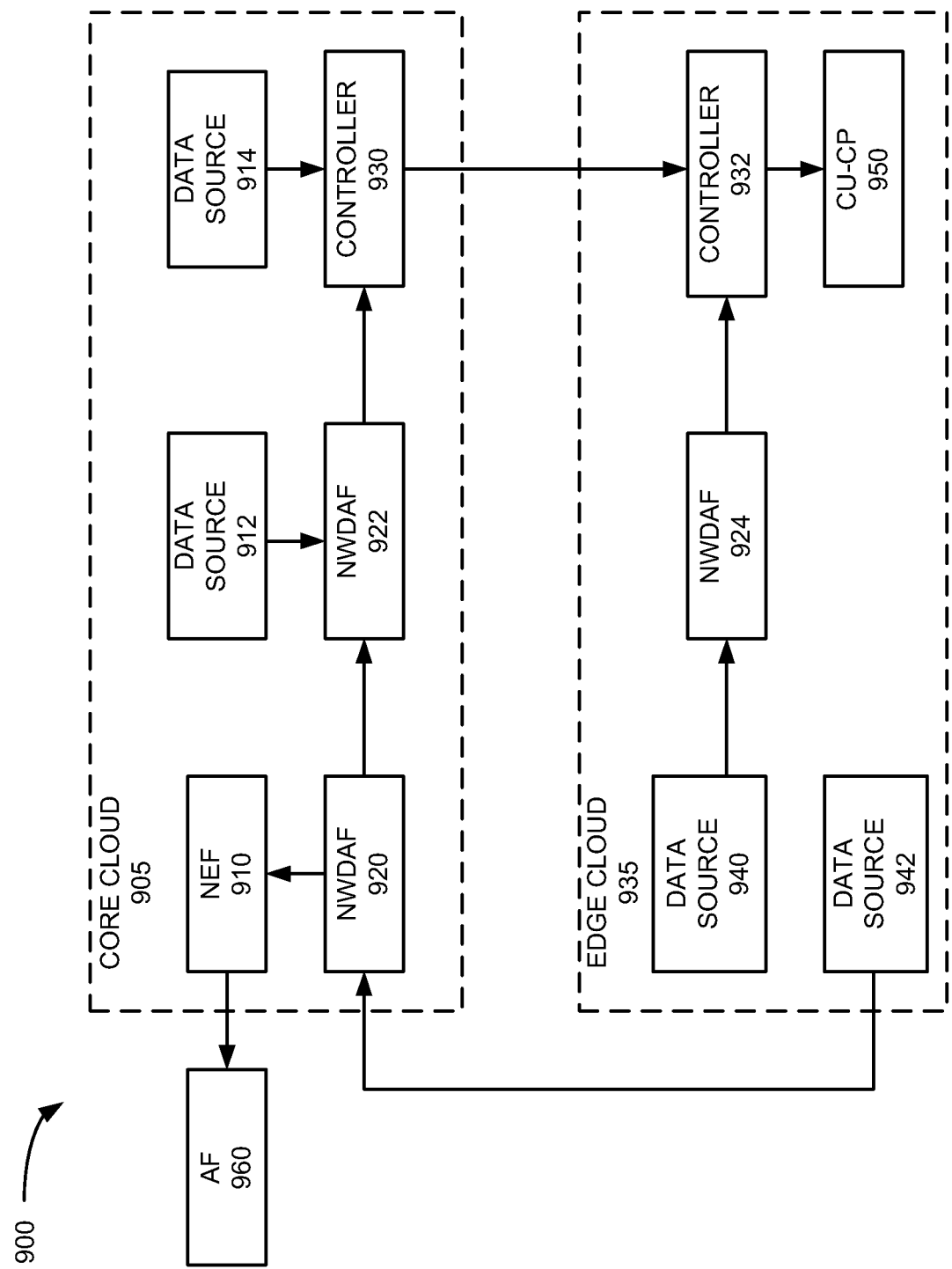
FIG. 9 illustrates an application in which analytics are deployed in a network environment in accordance with another exemplary implementation.

FIG. 9 illustrates an exemplary system 900 implemented in core cloud 905 and edge cloud 935. Core cloud 905 may correspond to elements deployed in core network 130 (FIG. 1) and edge cloud 935 may correspond to elements deployed on the edge of core network 130, such as at the interface between RAN 120 and core network 130. Referring to FIG. 9, system 900 includes network exposure function (NEF) 910, data sources 912 and 914, NWDAFs 920 and 922 and controller 930 deployed in core cloud 905. System 900 may also include data sources 940 and 942, NWDAF 924, controller 932 and centralized unit control plane (CU-CP) 950 deployed in edge cloud 935. System 900 may further include application function (AF) 960 deployed outside of core cloud 905 and edge cloud 935.

As illustrated, each NWDAF is provided with data from one of the data sources. For example, NWDAF 922 receives data from data source 912 as well as from NWDAF 920, and NWDAF 924 receives data from data source 940. Data sources 912, 914, 940 and 942 may correspond to virtual network functions and/or physical network functions, based on the particular network service. NWDAF 922 also provides input, such as data analytics and/or insights, to controller 930. Controller 930 may also provide control input to controller 932, which provides control information to CU-CP 950.

In system 900, core cloud 905 and edge cloud 935 are coupled and operate as a closed-loop control system. That is, controller 930 provides control information to controller 932, and data source 942 in edge cloud 935 provide input data to NWDAF 920. In addition, analytics in system 900 are exposed outside system 900 to AF 960, which may be an untrusted AF, via NEF 910. NEF 910 may expose capabilities and events to other network functions, AFs, such as AF 960, etc. AF 960 may provide services associated with particular actions, such as an application for modifying traffic routing, an application for interacting with a policy framework for policy control, etc. In each case, system 900 with NWDAFs and analytics controllers 930 and 932 provide for closed-loop control with respect to monitored network services.

Implementations described provide for automating the generation and deployment of analytics services/systems in a network. This allows the service provider to efficiently deploy analytics components for network services that may be dynamically created and updated. In addition, implementations described herein provide automated closed-loop control to manage and modify, if necessary, network policies, configurations of network devices/functions, etc., based on the monitored data. This further allows the service provider to ensure that network service delivery meets service requirements even if environments where network services are created and modified dynamically.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, implementations described above refer to using analytics engines and analytics controllers to monitor network services and providing control operations based on the monitoring. In other implementations, the functions of the analytics engines and analytics controllers may be combined into a single analytics device/component. Further, in some implementations, some or all of the functions performed by the analytics engines and/or controllers may be performed by the network functions implementing the network service.

Further, while series of acts have been described with respect to FIG. 8, the order of the acts may be different in other implementations. Moreover, non-dependent acts may be implemented in parallel.

To the extent the aforementioned embodiments collect, store or employ personal information of individuals, it should be understood that such information shall be collected, stored and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
    identifying, by a device, service requirements associated with a network service to be implemented in a network;
    identifying, by the device, at least one analytics component to monitor the network service;
    identifying, by the device, network functions to implement the network service;
    automatically deploying, by the device, the identified network functions to implement the network service;
    automatically deploying, by the device, the at least one analytics component to monitor the network service;
    implementing the network service;
    obtaining, by the network functions, data associated with monitoring the network service;
    forwarding, by the network functions, the data to the at least one analytics component; and
    determining, by the least one analytics component, whether to take a control action with respect to the network service.

2. The method of claim 1, wherein determining whether to take a control action comprises determining whether the network service is operating in accordance with the service requirements associated with the network service.

3. The method of claim 1, wherein at least one analytics component comprises an analytics engine and an analytics controller, the method further comprising:
identifying, by the analytics controller, the control action based on the data associated with monitoring the network service; and
signaling, by the analytics controller, at least one other device in the network to perform the control action.

4. The method of claim 3, further comprising:
automatically performing, by the other device, the control action.

5. The method of claim 4, wherein automatically performing the control action comprises at least one of:
setting a network policy, or
modifying a network policy.

6. The method of claim 1, further comprising:
identifying, by the least one analytics component, the control action based on the data associated with monitoring the network service; and
performing the control action.

7. The method of claim 1, wherein the identifying at least one analytics component comprises:
identifying at least one descriptor associated with the at least one analytics component based on the service requirements associated with the network service, and
selecting the at least one analytics component based on the identified at least one descriptor.

8. The method of claim 7, further comprising:
identifying, by the device, a logical link between at least one data source associated with the network service and the at least one analytics component, and
wherein deploying the at least one analytics component comprises:
deploying the at least one analytics component coupled to the at least one data source via the logical link.

9. The method of claim 1, wherein the at least one analytics component comprises an analytics controller, the method further comprising:
performing, by the analytics controller, the control action in response to determining to take the control action.

10. The method of claim 1, wherein the identifying network functions comprises:
identifying a network slice to implement the network service,
identifying the network functions to implement the network slice, and
identifying locations for the network functions.

11. The method of claim 1, wherein the least one analytics component comprises a network data analytics function (NWDAF), the method further comprising:
updating the NWDAF based on the obtained data associated with monitoring the network service.

12. The method of claim 1, further comprising:
identifying an analytics service descriptor based on the network service and the service requirements associated with the network service, wherein the analytics service descriptor identifies the at least one analytics component, at least one data source associated with the network service and one or more links between the at least one data source and the at least one analytics component.

13. The method of claim 12, wherein automatically deploying the at least one analytics component comprises:
automatically deploying the at least one analytics component at a location based on the analytics service descriptor.

14. A system, comprising:
at least one device configured to:
identify service requirements associated with a network service to be implemented in a network,
identify at least one analytics component to monitor the network service,
identify network functions to implement the network service,
automatically deploy the identified network functions to implement the network service, and
automatically deploy the at least one analytics component to monitor the network service based on the service requirements associated with the network service.

15. The system of claim 14, further comprising:
the at least one analytics component, wherein the at least one analytics component is configured to:
receive data from at least one network function associated with the network service, and
determine whether to take a control action with respect to the network service.

16. The system of claim 15, wherein the at least one analytics component is further configured to:
perform the control action, or
forward, to the at least one device, information identifying the control action.

17. The system of claim 14, wherein the at least one device is further configured to:
identify an analytics service descriptor based on the network service and the service requirements associated with the network service, wherein the analytics service descriptor identifies the at least one analytics component, at least one data source associated with the network service and one or more links between the at least one data source and the at least one analytics component.

18. The system of claim 17, wherein when automatically deploying the at least one analytics component, the at least one device is configured to:
deploy the at least one analytics component at a location based on the analytics service descriptor.

19. A non-transitory computer-readable medium comprising instructions, which when executed by at least one processor, cause the processor to:
identify service requirements associated with a network service to be implemented in a network;
identify at least one analytics component to monitor the network service;
identify network functions to implement the network service;
automatically deploy the identified network functions to implement the network service; and
automatically deploy the at least one analytics component to monitor the network service based on the service requirements associated with the network service.

20. The non-transitory computer-readable medium of claim 19, further comprising more instructions to cause the at least one processor to:
identify an analytics service descriptor based on the network service and the service requirements associated with the network service, wherein the analytics service descriptor identifies the at least one analytics component, at least one data source associated with the network service and one or more links between the at least one data source and the at least one analytics component.

\* \* \* \* \*